Dec. 6, 1960
W. J. JOHNSON
2,962,930
OPTICAL OBJECTIVE
Filed Nov. 13, 1958
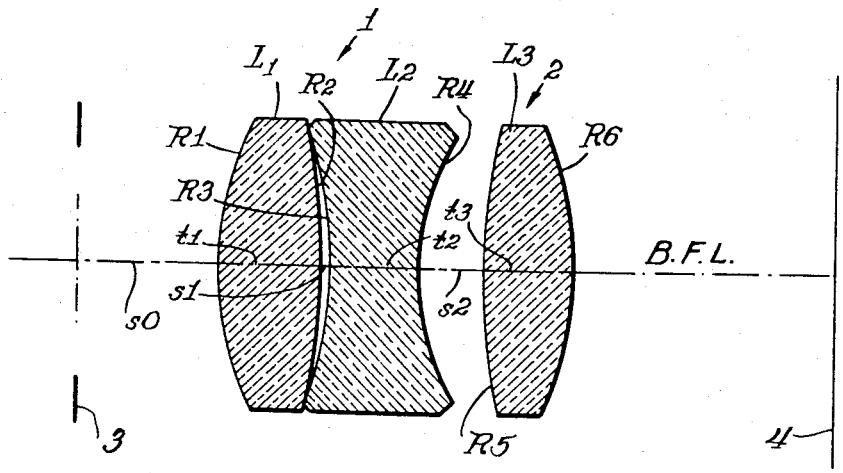
Inventor:
Walter J. Johnson
By Robert F. Mehler, Jr. Atty.

United States Patent Office 2,962,930
Patented Dec. 6, 1960

2,962,930

OPTICAL OBJECTIVE

Walter J. Johnson, Mundelein, Ill., assignor to Bell & Howell Company, Chicago, Ill., a corporation of Illinois Filed Nov. 13, 1958, Ser. No. 773,648

2 Claims. (Cl. 88—57)

This invention relates to an optical objective primarily intended for photographic purposes, but useful for other optical purposes as well.

It is an object of the invention to provide an optical objective having a front stop and corrected for spherical aberration, chromatic aberration, coma, astigmatism, field curvature and distortion.

Another object of the invention is to provide a photographic objective including an air separated front doublet having a thick negative rear lens and positioned a substantial distance behind the iris or aperture stop together with a positive rear singlet component.

It is to be understood that the terms "front" and "rear" as herein used refer to the ends of the objective respectively nearer the longer and shorter conjugates thereof, and that the light may be considered to be coming from left to right as viewed in the figure of the drawing, in which the single figure is a longitudinal section of an objective forming one embodiment of the invention.

The invention provides an optical objective comprising a front, air separated, doublet including a positive front lens and a thick negative rear lens together with a rear component comprising a positive singlet, all located behind an aperture stop.

The objective shown in the figure of the drawing has a front component formed by negative meniscus, air separated or edge contact, doublet including lenses $L_1$ and $L_2$. While the component 1 is preferably the air separated type, it also may be a cemented doublet. Closely behind the component 1 is positive component 2 consisting of a positive biconvex singlet lens $L_3$. The objective also includes an iris or aperture stop 3 positioned substantially in front of the component by a distance designated $S_0$ so that space for the stop is provided, and a focal plane 4 is positioned to the rear of lens $L_3$, the distance of the back focal length being designated B.F.L.

The distribution of power over the three lenses, as compared to the power of the objective as a unit is as follows:

$$.5\,F < f_1 < .7\,F$$
$$-.5\,F < f_2 < -.3\,F$$
$$.55\,F < f_3 < .8\,F$$

wherein $f_1$, $f_2$, and $f_3$ are the focal lengths of the three lenses, and F is the equivalent focal length of the combined objective.

In terms of power, the power of the lens $L_1$ is from 1.428 to 2.0 times the overall power of the objective, the power of the lens $L_2$ is from $-2.0$ to $-3.33$ times the overall power of the objective, and that of the lens $L_3$ is from 1.25 to 1.818 times the overall power of the objective.

When the objective is used with a camera having a mechanism for automatically adjusting the stop 3, mechanical limitations require the position of the aperture stop or iris 3 to be in front of the lens and considerable space is required therefor. Balance of oblique aberrations in design of the objective is obtained even with the front stop. With the lens system described, it is possible to position the aperture stop as much as .4 F forward of the vertex of the first lens surface. The lens aberrations are highly corrected even for this position of the aperture stop. To obtain high correction of the third and higher order aberrations of the front stop objective, the following relationships are required:

$$0 < s_1 < .05F$$
$$.10F < s_2 < .15F$$
$$.14F < t_2 < .22F$$
$$.15 < +\frac{R_2}{R_3} < 2.0$$
$$.9 < -\frac{R_2}{R_5} < 1.4$$

One preferred embodiment of the invention having a relative aperture of $f/2.3$ is made substantially in conformity with the following table in which dimensions are in terms of inches and $t_1$ to $t_3$ designate the respective axial thicknesses of the lenses, $s_1$ and $s_2$ the axial separations, $n_d$ the indices of refraction and V the Abbe dispersion number:

[Equivalent focal length=.394. Back focal length=.285. Focal length of component 1=−2.685]

| | | | | |
|---|---|---|---|---|
| $L_1$ | $R_1=+.245$ | $t_1=.078$ | $n_d=1.745$ | $V=45.8$ |
| | $R_2=-.562$ | | | |
| | | $s_0=.119$ | | |
| | | $s_1=.009$ | | |
| $L_2$ | $R_3=-.317$ | $t_2=.069$ | $n_d=1.720$ | $V=29.3$ |
| | $R_4=+.197$ | | | |
| | | $s_2=.050$ | | |
| $L_3$ | $R_5=+.4925$ | $t_3=.069$ | $n_d=1.697$ | $V=56.2$ |
| | $R_6=-.273$ | | | |

While the invention is thus described, it is not to be limited to the precise details described, as changes may be readily made without departing from the spirit of the invention.

What is claimed is:

1. An optical objective comprising a positive front lens, a thick negative intermediate lens in edge contact with the front lens, and a positive rear lens positioned to the rear of the intermediate lens, and further characterized by the objective being in substantial compliance with the following table wherein dimensions are in terms of inches and beginning with the front of the objective $L_1$ to $L_3$ designate the lenses, $R_1$ to $R_6$ the radii of curvature of the surfaces, $t_1$ to $t_3$ the axial thicknesses, $s_1$ to $s_2$ the axial separations, $n_d$ the indices of refraction for the D line, and V the Abbe dispersion numbers:

[Equivalent focal length=.394. Back focal length=.285]

| | | | | |
|---|---|---|---|---|
| $L_1$ | $R_1=+.245$ | $t_1=.078$ | $n_d=1.745$ | $V=45.8$ |
| | $R_2=-.562$ | | | |
| | | $s_1=.009$ | | |
| $L_2$ | $R_3=-.317$ | $t_2=.069$ | $n_d=1.720$ | $V=29.3$ |
| | $R_4=+.197$ | | | |
| | | $s_2=.050$ | | |
| $L_3$ | $R_5=+.4925$ | $t_3=.069$ | $n_d=1.697$ | $V=56.2$ |
| | $R_6=-.273$ | | | |

2. An optical objective comprising a stop, a positive front lens positioned behind the stop, a thick negative intermediate lens in edge contact with the front lens, and a positive rear lens positioned to the rear of the intermediate lens, and further characterized by the objective being in substantial compliance with the following relationships wherein dimensions are in terms of inches and beginning with the front of the objective $L_1$ to $L_3$ designate the lenses, $R_1$ to $R_6$ the radii of curvature of the surfaces, $t_1$ to $t_3$ the axial thicknesses, $s_0$ to $s_2$ the axial separations, $n_d$ the indices of refraction for the D line, and V the Abbe dispersion numbers:

[Equivalent focal length=.394. Back focal length=.285]

| | | | | |
|---|---|---|---|---|
| $L_1$ | $R_1=+.245$ | $t_1=.078$ | $n_d=1.745$ | $V=45.8$ |
| | $R_2=-.562$ | | | |
| | | $s_0=.119$ | | |
| | | $s_1=.009$ | | |
| $L_2$ | $R_3=-.317$ | $t_2=.069$ | $n_d=1.720$ | $V=29.3$ |
| | $R_4=+.197$ | | | |
| | | $s_2=.050$ | | |
| $L_3$ | $R_5=+.4925$ | $t_3=.069$ | $n_d=1.697$ | $V=56.2$ |
| | $R_6=-.273$ | | | |

References Cited in the file of this patent

UNITED STATES PATENTS

| | | |
|---|---|---|
| 444,714 | Rudolph | Jan. 13, 1891 |
| 682,017 | Aldis | Sept. 3, 1901 |
| 775,353 | Von Rohr | Nov. 22, 1904 |
| 895,045 | Rudolph | Aug. 4, 1908 |
| 1,352,028 | Ross | Sept. 7, 1920 |
| 1,776,398 | Shore | Sept. 23, 1930 |
| 1,939,098 | Berek | Dec. 12, 1933 |
| 2,202,749 | Tronnier | May 28, 1940 |
| 2,391,114 | Aklin | Dec. 18, 1945 |
| 2,720,814 | Sandback | Oct. 18, 1955 |

FOREIGN PATENTS

| | | |
|---|---|---|
| 177,266 | Germany | Nov. 7, 1906 |
| 601,649 | Great Britain | May 10, 1948 |

OTHER REFERENCES

"Telecentric Imagery by Means of Optical Systems for Measuring Apparatus," Malfeld, Microtenic, vol. XI, No. 5, pages 216–222.